Jan. 28, 1964   R. R. FAGAN ETAL   3,119,554
ELECTRIFIED STICK FOR POSTMAN
Filed Jan. 7, 1963
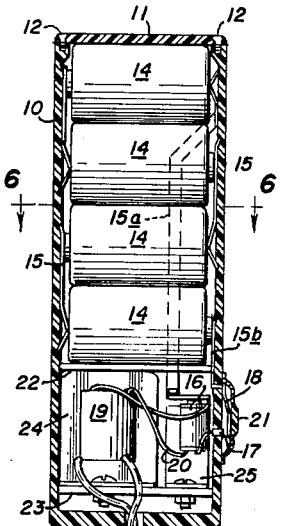
FIG. 2.
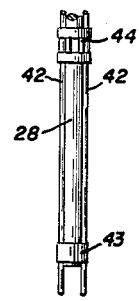
FIG. 3.
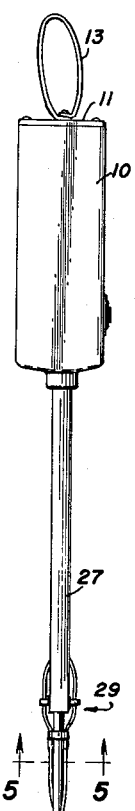
FIG. 1.
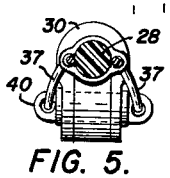
FIG. 5.
FIG. 4.
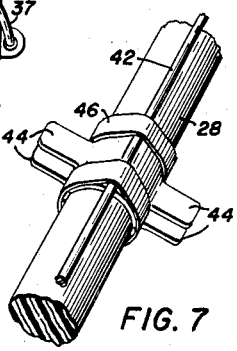
FIG. 7.
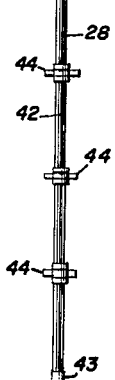
FIG. 8.
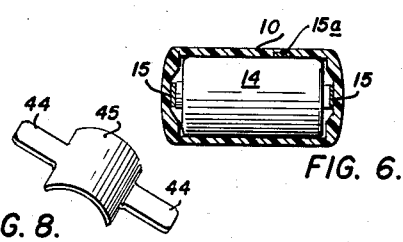
FIG. 6.
RUSSELL R. FAGAN
ROY L. HARRISON
            INVENTORS
BY *Herbert J. Brown*
            ATTORNEY 3,119,554
ELECTRIFIED STICK FOR POSTMAN
Russell R. Fagan and Roy L. Harrison, both of
Box 244, Anson, Tex.
Filed Jan. 7, 1963, Ser. No. 249,830
1 Claim. (Cl. 231—2)

This invention relates to animal handling equipment and has reference to an electrically charged stick for use by postmen and deliverymen for protection against biting dogs.

The use of electrified prods for loading cattle is well known, and which prods consist of projecting electrodes on the ends of shafts for punching the cattle to be moved. One such prior prod additionally includes helical electrodes adjacent the projecting electrodes, but which electrodes would not be effective on dogs having long thick hair. Accordingly, an object of the invention is to provide an electrical stick for protection against dogs including those having long thick hair, and at the same time providing humane treatment to the animals acted upon.

Another object is to provide a stick for the described purpose which may be either swung at an attacking animal or thust end first to produce a mild but effective shock.

Another object of the invention is to provide an electrical stick which is self-contained and one which may be folded for convenience in carrying, for example, on public conveyances.

A further object is to provide an electrical stick so constructed and arranged that an attacking dog will not grab the stick with his mouth without an electrical shock.

These and other objects of the invention will become apparent from the following description and the accompanying drawings, wherein:

FIGURE 1 is an elevational view of a preferred embodiment of the invention.

FIGURE 2 is an enlarged fragmentary sectional and elevational view of the upper portion of FIGURE 1.

FIGURE 3 is an enlarged broken elevational view of the lower portion of FIGURE 1, but taken at a right angle with reference thereto.

FIGURE 4 is an enlarged fragmentary and sectional view of the hinge and taken at a right angle with reference to FIGURES 1 and 2.

FIGURE 5 is an enlarged sectional view taken on line 5—5 of FIGURE 1.

FIGURE 6 is a sectional view taken on line 6—6 of FIGURE 2.

FIGURE 7 is a fragmentary perspective view of a portion of the extending end of the stick and showing transverse electrodes thereon.

FIGURE 8 is a perspective view of one of the transverse electrodes.

In the drawing, the numeral 10 generally designates a rectangular battery case of dielectric material, which case also serves as a handle for the stick to be described. The upper end of the case has a flat cover 11 held in place by screws 12, and the outer surface of the cover, at its center, has a loop 13 of leather or other flexible strap material for carrying the device on the wrist. As shown in FIGURE 2, dry cell batteries 14 are received in the case 10 and are connected in series with each other by metal strip conductors 15. One end conductor 15a is connected with a vibrator 16 in the case 10 and thence with a contact 17 of a normally open switch 18. Since such wiring is well known to the art, a wiring diagram is not shown. The remaining end conductor 15b is directly connected with the switch 18 and the vibrator 16 is connected with a step-up transformer 19 by leads 20 in the usual manner. Other details shown in FIGURE 2 include a cross member 22 for locating the batteries 14, and another cross member 23 having brackets 24 and 25 thereon for supporting the transformer 19 and the vibrator 16.

On the end of the case 10 opposite the cover 11 there is an integral socket 26 receiving the end of a tubular shaft 27 which, in turn, is connected with one end of an insulated rod 28 by a hinge 29. The shaft 27 and the rod 28 comprise the stick herein referred to. The hinge 29 is comprised of a shouldered fitting 30 received in the end of the tubular shaft 27, and which fitting has off-set ears 31 receiving an off-set 32 on the end of the rod 28. A hinge pin 33 connects the ears 31 with the rod offset 32. As best shown in FIGURE 4, the outer end of the fitting 30 is recessed at 34 to receive the end of the rod 28, the side wall of which recess has a projection 35 for engagement in a notch 36 in the rod, the latter being of resilient material.

A pair of insulated wires 37 are connected with the output terminals (not shown) of the transformer 19 and extend through an opening 38 in the case 10, through the tubular shaft 27, outwardly through openings 39 in opposite sides of the shaft near the hinge 29, through eyes 40 on the ends of the hinge pin 33 to positions along opposite sides of the rod 28 where they are secured by a ring clamp 41 of dielectric material. Parallel electrodes or electrically exposed wires 42 are connected with the wires 37 and extend a short distance beyond the length of the rod 28 where they are held in place by another ring clamp 43 of dielectric material around the end of the rod. Spaced parallel transverse electrodes 44 are mounted in pairs along the length of the rod 28 and are electrically connected with the longitudinal electrodes 42. Each transverse electrode 44 has an arcuate body 45, the arc of which is less than one-half the circumference of the rod 28, and each body is wider than its integral electrodes so as to provide an area for securing the electrodes to the rod by means of dielectric ring clamps 46.

The longitudinal and tranverse electrodes 42 and 44 are energized by closing the switch 18. With the rod 28 extended, an attacking animal may be repelled by prodding with the longitudinal electrodes 42 or by swinging the extended rod to bring a pair of transverse electrodes in contact with the animal. It is to be noted that the transverse electrodes 44 are at right angles to the axis of the hinge 29 for support at the hinge when swinging in one direction. If an animal should grab the rod 28 by its mouth the longitudinal electrodes 42 would impart a shock.

The invention is not limited to the exemplary construction herein shown and described, but may be made in various ways within the scope of the appended claim.

What is claimed is:

An electrical stick for controlling animals, said stick being comprised of a shaft, an insulated rod and a hinge connecting ends of said shaft and said rod, a source of current carried by said shaft, a spaced pair of electrodes projecting from the end of said rod opposite said hinge, a plurality of spaced pairs of laterally projecting transverse electrodes along the length of said rod, exposed wires on said rod and connected with all said electrodes, and additional wires connecting said exposed wires with said source of current.

References Cited in the file of this patent
UNITED STATES PATENTS

| | | |
|---|---|---|
| 1,140,365 | Dixon | May 25, 1915 |
| 2,561,122 | Juergens | July 17, 1951 |
| 2,981,465 | Bartel | Apr. 25, 1961 |